United States Patent [19]
Schaffer

[11] Patent Number: 5,353,314
[45] Date of Patent: Oct. 4, 1994

[54] ELECTRIC FIELD DIVERTOR PLASMA PUMP

[75] Inventor: Michael J. Schaffer, San Diego, Calif.

[73] Assignee: The United States of America as represented by the United States Department of Energy, Washington, D.C.

[21] Appl. No.: 769,633

[22] Filed: Sep. 30, 1991

[51] Int. Cl.$^5$ .............................................. G21B 1/00
[52] U.S. Cl. ................................................... 376/134
[58] Field of Search ............... 376/134, 135, 137, 140, 376/141, 147

[56] References Cited

U.S. PATENT DOCUMENTS

| | | | |
|---|---|---|---|
| 4,217,171 | 8/1980 | Schaffer | 376/125 |
| 4,252,605 | 2/1981 | Schaffer | 376/125 |
| 4,252,609 | 2/1981 | Kerst et al. | 376/134 |
| 4,615,860 | 10/1986 | Schaffer | 376/133 |
| 4,734,247 | 3/1988 | Schaffer | 376/133 |

FOREIGN PATENT DOCUMENTS 62-251692 11/1987 Japan .................................. 376/134

OTHER PUBLICATIONS

Artsimovich, L. A., *Nuclear Fusion*, 12:215-252 (1972).
ASDEX Team, *Nuclear Fusion*, 29:1959-2040 (1989).
Furth, H. P., *Nuclear Fusion*, 15:487-534 (1975).
Shimomura, et al., *Physics of Fluids*, 19:1635-1640 (1976).
Smith, J., "Design of the DIII-D Advanced Divertor", *Proceedings*, 13th *IEEE Symposium on Fusion Engineering*, (Oct. 2-6, 1989) pp. 1315-1318.
Strait, E. J., et al., "Experimental Demonstration of ExB Plasma Divertor", *Phys. Fluids*, 21/12:2342-2344, (1978).
Strait, E. J., "Poloidal Divertor Experiment with Applied ExB/B$_2$ Drift", *Nuclear Fusion*, 21/8:943-951 (1981).
"UWMAK-II, A Conceptual Tokamak Power Reactor Design", UWFDM-112, Oct. 1975, pp. II-B-39, 40.
"Tokamak Reactors for Breakeven", Knoepfel, 1978, p. 574.
"Model for Particle Balance in Pumped Divertors", Hogan, ORNL/TM-11562, Aug. 1990.

*Primary Examiner*—Daniel D. Wasil
*Attorney, Agent, or Firm*—Miguel A. Valdes; Roger S. Gaither; William R. Moser

[57] ABSTRACT

An electric field plasma pump includes a toroidal ring bias electrode (56) positioned near the divertor strike point of a poloidal divertor of a tokamak (20), or similar plasma-confining apparatus. For optimum plasma pumping, the separatrix (40) of the poloidal divertor contacts the ring electrode (56), which then also acts as a divertor plate. A plenum (54) or other duct near the electrode (56) includes an entrance aperture open to receive electrically-driven plasma. The electrode (56) is insulated laterally with insulators (63,64), one of which (64) is positioned opposite the electrode at the entrance aperture. An electric field E is established between the ring electrode (56) and a vacuum vessel wall (22), with the polarity of the bias applied to the electrode being relative to the vessel wall selected such that the resultant electric field E interacts with the magnetic field B already existing in the tokamak to create an E×B/B$^2$ drift velocity that drives plasma into the entrance aperture. The pumped plasma flow into the entrance aperture is insensitive to variations, intentional or otherwise, of the pump and divertor geometry. Pressure buildups in the plenum or duct connected to the entrance aperture in excess of 10 mtorr are achievable.

14 Claims, 8 Drawing Sheets

ELECTRIC FIELD DIVERTOR PLASMA PUMP

The present invention was developed under funding provided by the U.S. Department of Energy under one or more of the following Contract Numbers: DE-AC03-89ER51114; DE-AC05-84OR21400; W-7405-ENG-48; and DE-AC03-76DP00789. The U.S. Government has rights in this invention.

BACKGROUND OF THE INVENTION

The present invention relates to plasma devices, particularly devices of the tokamak type used in connection with the study and generation of thermonuclear fusion energy. More particularly, the invention relates to a geometry-insensitive high capacity electric field divertor pump that may used to drive plasma through a desired entrance aperture.

Fusion is the energy source of the sun and other stars. While science has not yet advanced sufficiently far to allow fusion to be used as a practical energy source, scientists and engineers, working at laboratories around the world, are making great strides relative to fusion research and to the engineering development of fusion for electrical power and other applications. Advantageously, fusion fuel is in abundant supply, and the generation of fusion energy provides a safe and clean energy source.

In generating fusion energy, the atoms of two or more fuels, typically deuterium ($^2$H) and tritium ($^3$H), heavy hydrogen isotopes, are exposed to extremely high temperatures. Such high temperatures separate the positively charged nuclei of the hydrogen isotopes from their normally tightly bound negatively charged electrons, forming a plasma. (A plasma is a hot ionized gas.) When this separation occurs, the neutrons and protons of the nuclei recombine to form a heavier element, such as $^4$He, and a neutron or other small nuclear particle. Energy from this reaction is released as kinetic energy of the fast moving reaction products, and it can be converted to heat. The heat thus created provides the high temperature needed to sustain the fusion reaction, and portions thereof can be extracted and used as a useful energy source, e.g., to generate electricity.

The conditions for the fusion reaction are very difficult to achieve. For example, in order to kindle a deuterium-tritium fusion fire, the temperature of the fuel must be heated to over 50,000,000° C. Moreover, to sustain the fusion fire, i.e., to keep the fusion reaction going, it is necessary to confine the normally chaotic mass of fast moving, superheated nuclei (the plasma) long enough for the fuel to react and produce energy beyond that necessary to sustain the temperature. To produce enough fusion reactions to make the process worthwhile, the heat losses from the fuel must be low enough so that the fuel can sustain a temperature of around 150,000,000° C. One such a self-sustaining reaction is achieved, it is possible to use the heat thus produced to generate electricity, or for other purposes.

Achieving such high temperatures requires supplying energy to the fuel and raising its temperature to a level where the internal fusion reactions can provide further heating. Various techniques are currently used to accomplish such heating, e.g., heating with an internal electric current, heating by various waves, and heating by the injection of energetic neutralized hydrogen atoms ("neutral beam injection").

Unlike the sun and stars, where the massive plasma ball is confined by gravity, fusion reactors require some type of container for holding the 50,000,000° C. plasma fireball in a way that prevents it from touching the container walls. (Plasma, which has a density approximately 100,000 times lower than atmospheric pressure, is a mere puff of gas that would quickly cool if it touched the container walls.)

Fortunately, because plasma is an ionized gas, it can be confined with a magnetic field. That is, the otherwise random motion of the charged particles that are found within plasma may be converted to an orderly form of motion that follows the magnetic field lines of an applied magnetic field. Thus, various types of "magnetic bottles" have been developed in the art to create the appropriate magnetic field lines to confine the plasma to a desired volume.

One of the most highly developed magnetic bottles is a toroidal bottle known as the "tokamak". Tokamaks were first developed during the 1960s in the USSR, and have subsequently been adopted as the leading magnetic confinement device. A tokamak includes both external toroidal-field coils and poloidal-field coils that generate magnetic fields, as well as means for generating a toroidal electrical current that flows through the plasma itself. The magnetic fields created by such toroidal- and poloidal-field coil currents, as well as by the plasma electric current, all combine to confine the plasma to a general toroidal shape that encircles a major axis of the tokamak. The poloidal-field coils are also used to magnetically shape the general cross section of the plasma. Tokamaks are well documented in the literature. See, e.g., Artsimovich, L. A., *Nuclear Fusion*, Vol. 12, pp. 215 et seq. (1972); and Furth, H. P., *Nuclear Fusion*, Vol. 15, pp. 487 et seq. (1975).

One of the housekeeping tasks associated with the operation of a tokamak is the efficient removal of spent plasma, or plasma exhaust. The external poloidal-field coils of a tokamak may advantageously be used to create one or more "poloidal divertors". See, e.g., Shimomura et al., *Physics of Fluids*, vol. 19, pp. 1635 et seq. (1976). Broadly stated, a poloidal divertor sets up a magnetic field that manages the plasma exhaust. More specifically, a poloidal divertor guides a thin boundary layer of escaping plasma, known as the scrape-off layer (SOL), located just outside the separatrix, along magnetic lines to solid "divertor targets." (The "separatrix", explained more fully below, is the magnetic surface defined by the applied magnetic fields that separates plasma confined by the magnetic field from plasma not confined by the magnetic field. Figuratively, the separatrix is the "lip" of a magnetic "jar".) Such targets are designed to absorb high heat and particle flux. Unfortunately, it is difficult to design a divertor target that can withstand the spatially peaked thermal loads that occur during a fusion reaction, particularly a long or sustained fusion reaction. Hence, it is preferable that the fusion reactor employ some means for "sweeping" the divertor strike point across the target so as to reduce the heat flux by time averaging.

As the plasma strikes the targets, it cools and neutralizes, becoming a gas, comprised of hydrogen isotopes, helium ash and contaminants eroded from the divertor targets and walls. Such gas needs to be pumped away from the targets in order to prevent its buildup, which buildup (if allowed to continue) would quench the hot plasma. Such buildup has not heretofore been a major problem because the fusion reaction experiments performed to date have been of short duration. However, as the experiments become of longer and longer duration, eventually leading to a continuous nuclear reaction, the need to efficiently remove the neutralized plasma away from the divertor targets will become particularly acute.

Unfortunately, due to the very low pressure associated with the neutral gas near the targets (usually <1 milliTorr), adequate pumping of the gas would require many large ducts through the tritium breeding blanket, radiation shield, and magnet coils of the tokamak. Such ducts would not only take up valuable space in the tokamak, but would also significantly complicate the radiation shielding. What is needed, therefore, is a plasma pump that can efficiently pump the plasma exhaust away from the targets without the need for a large number of massive ducts.

Disadvantageously, pumping of the plasma exhaust (ash and contaminants) is made even more difficult when the desirable high-plasma-confinement operating mode (H-mode) of the tokamak is employed. This is because in the H-mode the plasma retains all ion species for a relatively longer period of time, and the gas pressure near the divertor targets is thus correspondingly less. Hence, what is needed is a means of efficiently removing or pumping plasma exhaust even when the tokamak is operating in the H-mode. (The H-mode tokamak operating regime is fully described in the literature, see, e.g., ASDEX Team, *Nuclear Fusion*, vol. 29, pp. 1959–2040 (1989).

It is known in the art to build a plenum around the divertor targets designed to collect the plasma exhaust through an aperture opened to the divertor targets. The divertor exhaust gas pressure can be favorably increased by optimizing the entrance aperture geometry for minimum gas backstreaming. However, this makes the pressure very sensitive to small variations of the divertor geometry and plasma conditions. Where the divertor strike point is swept across the target, the entrance aperture geometry is dynamic, and the effectiveness of the plenum at collecting the diverted plasma is severely curtailed. What is needed, therefore, is a means of pumping or forcing the plasma exhaust into the aperture of a collecting plenum that is not significantly geometry sensitive, thereby allowing such plasma pump to be used with a dynamic entrance aperture geometry, such as exists when the divertor strike point is swept across the target.

Some experimental work has been done aimed at applying an electric field E to a plasma flow confined by a magnetic field B, and using the resulting $E \times B$ drift of the plasma particles to divert the plasma in a desired direction. See, e.g., Strait, E. J., "Poloidal Diverter Experiment With Applied $E \times B/B^2$ Drift", *Nuclear Fusion*, Vol. 21, No. 8, pp. 943–51 (1981); and Strait, et al., "Experimental Demonstration of $E \times B$ Plasma Divertor", *Phys. Fluids*, Vol. 21, No. 12, pp. 2342–44 (December 1978). Despite some promising data, however, there still remains a need for a practical application of the principles underlying such experiments to the conditions that prevail in high power tokamak divertors.

SUMMARY OF THE INVENTION

The present invention provides an electric field plasma pump that addresses the above and other needs. The pump includes a toroidal ring bias electrode that is positioned so as to be near the divertor targets and an entrance aperture through which the plasma is to be pumped. In a preferred embodiment, the ring bias electrode functions as the divertor target. An electric field E is established between the ring electrode and an inner vessel wall of the tokamak, or other plasma-confining apparatus. The electric field E interacts with the B fields already existing in the tokamak to create an $E \times B$ drift velocity that drives the plasma through the entrance aperture.

In accordance with one aspect of the invention, a plasma pump is used in a plasma-confining device, such as a tokamak. The tokamak includes means for generating a magnetic field B to confine the plasma to a prescribed volume. The plasma pump may be characterized as including: (a) electrode means for establishing an electric field E that interacts with the magnetic field B to electromagnetically drive the plasma in a desired direction, e.g., towards an aperture point; and (b) duct means for collecting plasma at the aperture point. The electrode means includes a ring electrode that is symmetric with a major axis of the plasma-confining device. The plasma-confining device further includes magnetic divertor means for diverting plasma along the thin scrape-off layer (SOL) just outside the separatrix. The separatrix is the magnetic surface that defines a boundary between plasma that is magnetically confined within the plasma-confining device from plasma that is not confined. The plasma pump of the present invention functions best when the separatrix is positioned to be in contact with the ring electrode, which then also functions as a divertor target.

In accordance with another aspect of the invention, the plasma pump is adapted to interface with the plasma diverted to a strike zone of a divertor target by divertor means, e.g., poloidal divertor means, used within plasma-confining apparatus. The plasma pump may be characterized as including: (a) an entrance aperture facing a divertor target, through which the plasma is to be pumped; (b) an electrode positioned proximate the divertor target and the entrance aperture, such electrode being electrically insulated from the walls of the plasma confining apparatus; and (c) means for applying an electric field E between the electrode and the electrically conductive walls. In a preferred embodiment of the plasma pump, the electrode also functions as the divertor target. Advantageously, the electric field combines with the magnetic field so as to impart a $E \times B$ drift velocity to the plasma, which drift velocity drives the plasma through the entrance aperture.

In accordance with a further aspect of the invention, a method is provided for removing plasma exhaust from a tokamak system. The tokamak system, as previously described, includes a vessel and means for generating a magnetic field B that confines plasma to a toroidal volume within the vessel. The tokamak system further includes a poloidal divertor having a separatrix X-point and scrape-off layer (SOL) associated therewith, with plasma being diverted by the poloidal divertor along the SOL to a strike position adjacent the X-point. The tokamak system also includes duct means, such as a plenum, for collecting plasma exhaust. Such duct means are at the same electrical potential as the vessel wall. The method includes the steps of: (a) positioning a ring electrode near the strike position so that the ring electrode makes contact with plasma in the SOL; (b) insulating a plasma-facing side of the ring electrode from the vessel walls and duct means of the tokamak system with a first insulator; (c) insulating a portion of the vessel wall adjacent the strike position but spaced apart from the ring electrode with a second insulator; (d) positioning an entrance aperture of the duct means intermediate to the ring electrode and second insulator; and (e) applying an electric field E between the ring electrode and the vessel wall, whereby a E×B drfit force is developed that drives plasma being diverted towards the strike position through the entrance aperture.

Advantageously, an electric field plasma pump made or used in accordance with the present invention lends itself to a wide variety of applications, including: (1) reducing the vacuum pumping requirements for steady state plasmas; (2) exhausting plasma from low density plasmas; (3) establishing low collisionality, low density H-mode plasmas for current drive; and (4) making plasma exhaust insensitive to divertor geometry, especially to the variable geometry of swept divertors.

It is thus a feature of the present invention to provide an electric field divertor pump for use with a poloidal divertor of a tokamak, or similar plasma-confining device, that efficiently pumps plasma exhaust through an entrance aperture into a duct or collecting plenum whereat the neutralized plasma may be removed as gas.

It is a further feature of the invention to provide a plasma divertor pump wherein a bias electrode also functions as a divertor target.

It is another feature of the invention to provide such a plasma divertor pump that efficiently performs its pumping function regardless of the operating mode of the tokamak, or similar device.

It is a further feature of the invention to provide such a divertor pump that is geometry-insensitive, and that therefore can be efficiently used even when the divertor strike point is swept across the target.

It is an additional feature of the invention to provide a divertor pump that uses self consistent internal and applied external electric fields to actively force the plasma to a desired pump entrance aperture.

It is yet a further feature of the invention to provide such a divertor pump for use with a poloidal divertor of a tokamak that favorably traps and minimizes back-streaming of the plasma exhaust particles, despite the extremely low pressure associated with the plasma exhaust.

BRIEF DESCRIPTION OF THE DRAWINGS

The above and other aspects, features and advantages of the present invention will be more apparent from the following more particular description thereof, presented in conjunction with the following drawings wherein:

FIG. 1A defines the major and minor axes associated with a tokamak;

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
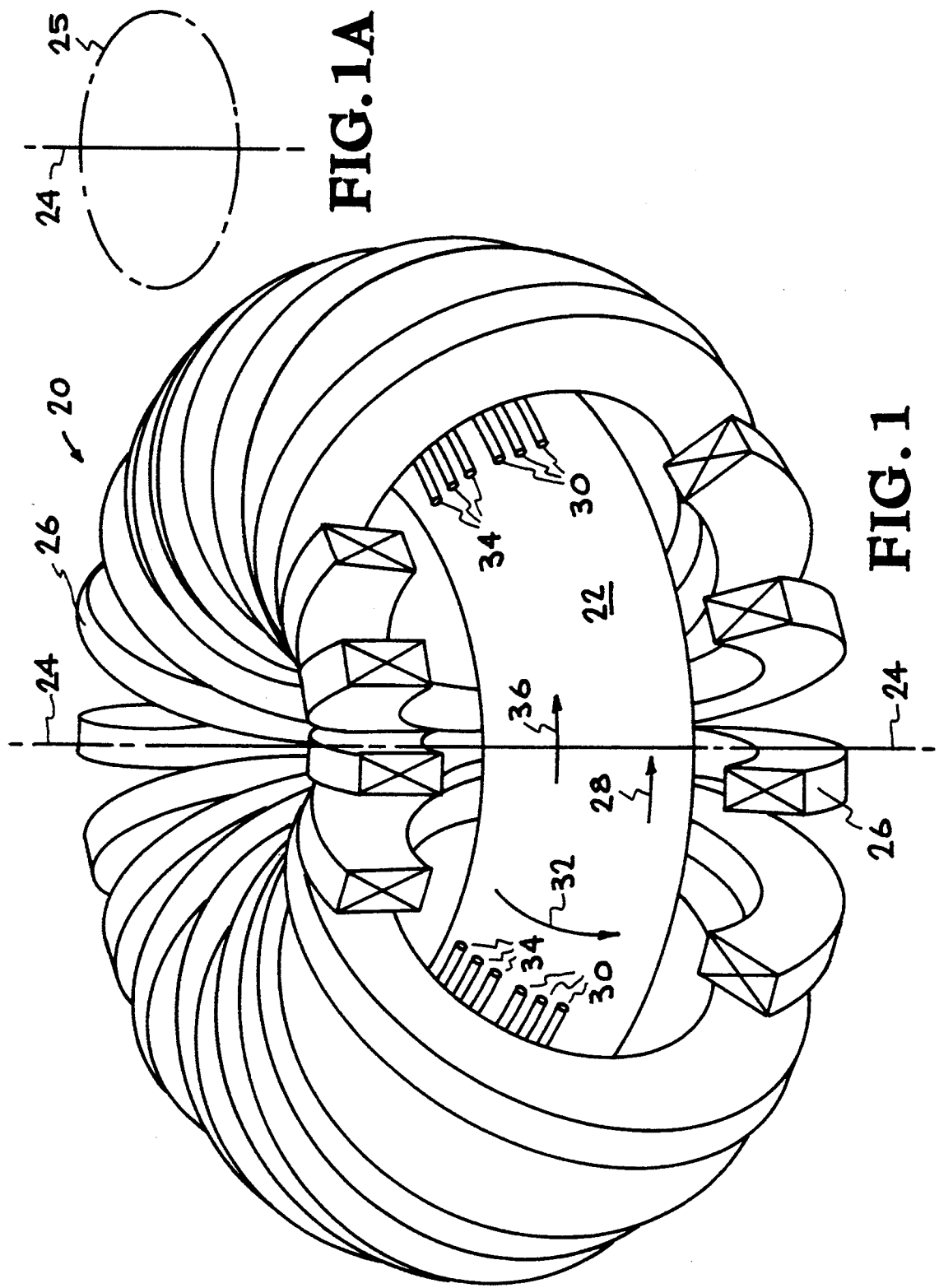
FIG. 1 is a diagrammatic view of a generic tokamak without a divertor, with a portion thereof cutaway.

Referring first to FIG. 1, there is shown a diagrammatic view of the main elements of a tokamak 20, with a portion thereof cutaway. The design and operation of such a tokamak is well described in the art, see, e.g., Artsimovich and/or Furth, supra. Only a very cursory overview of the tokamak's construction and operation is thus presented herein.

Basically, the tokamak 20 includes a toroidal vacuum vessel 22 that is centered about a major axis 24. A minor axis 25, centrally located within the toroidal vessel 22, encircles the major axis 24. The relationship of the major and minor axes 24 and 25 is best seen in FIG. 1A.

The vessel 22 is made from a conductive material, such as non-magnetic stainless steel or inconel, and is constructed with sufficiently thick walls to withstand the vacuum pressures that are developed therein. A large number of toroidal field magnetic coils 26 are equally spaced around the vessel 22, each encircling the minor axis 25 and a respective segment of the vessel 22. Eighteen such coils 26 are illustrated in FIG. 1, but this number is only exemplary. When energized with an electrical current, the toroidal coils 26 combine to produce a toroidal magnetic field $B_T$, represented by the arrow 28, that encircles the major axis 24 within the vacuum vessel 22.

A plurality of poloidal field magnetic coils 30 are positioned inside of the toroidal field coils 26, yet still outside of the vacuum vessel 22, so as to encircle the major axis 24. As depicted in FIG. 1, the windings of the poloidal field coils 30 are substantially perpendicular to the windings of the toroidal field coils 26. When energized with an appropriate electrical current, the poloidal field magnetic coils 30 combine to produce a poloidal magnetic field $B_P$, represented by the arrow 32, that encircles the minor axis 25 of the vacuum vessel 22.

Ohmic heating primary windings 34 are positioned inside of the toroidal field coils 26, in close contact with the vacuum vessel 22, so as to encircle the primary axis 24, much like the poloidal field coils 30. When energized with an electrical current, the field coils 30 (acting as a transformer primary winding) induce an electrical current, $I_p$, 36 in the plasma (acting as a transformer secondary winding) to heat the plasma.

Not shown in FIG. 1, but understood to be part of any tokamak or similar plasma-confining structure are conventional means for establishing a desired vacuum pressure within the vessel 22, and means for injecting the appropriate gases into the vessel from which plasma may be formed. Because plasma is an ionized gas, it is also an electrical conductor, with the movement of electrons (negatively charged particles) in one direction and the movement of positively charged ions in the other direction representing the flow of electrical current. An important part of the operation of a tokamak is the creation of axial current flow through the plasma contained within the vessel 22. Such current flow follows the minor axis 25 and is depicted in FIG. 1 by the arrow 36.

In operation, appropriate gases are introduced into the vacuum vessel at the appropriate pressure. These gases, e.g., $^2H$ and $^3H$, are heated to extremely high temperatures in order to form a hot plasma. The toroidal magnetic field $B_T$ confines the plasma to a toroidal volume inside of the vessel 22 that does not touch the walls of the vessel. This occurs because the toroidal magnetic field $B_T$ has lines of magnetic force coincident or parallel with the minor axis 25, and plasma, as a whole, is substantially confined to and follows magnetic lines of force, forming as it were a plasma ring.

The poloidal magnetic field $B_P$ is needed to complete the plasma confinement against drifts caused by gradients in $B_T$. The combined fields form, as it were, a plasma and magnetic vortex. The externally applied component of $B_P$ is also used to shape the cross sectional area of the plasma ring within the toroidal plasma volume to a desired shape. For example, at some points within the vessel, or at some times when the plasma is within the vessel, the cross sectional area of the plasma cloud may be "squeezed" thereby compressing the plasma into a smaller volume, and further increasing its temperature. At other points within the vessel, or at other times, the cross sectional shape of the plasma cloud may be expanded, with some of the plasma particles being diverted away from the main plasma body. Such control of the cross-sectional shape of the plasma cloud is, as indicated, controlled by the poloidal field coils 30. For this reason, such coils are sometimes referred to as the "shaping field coils" or "shaping field windings", Of particular relevance to the present invention, the poloidal magnetic field $B_P$ is also used as a secondary magnetic field to divert some of the plasma out of the main plasma cloud or body to a suitable target, where the plasma can be neutralized and removed from the vessel 22.

Figure 2:
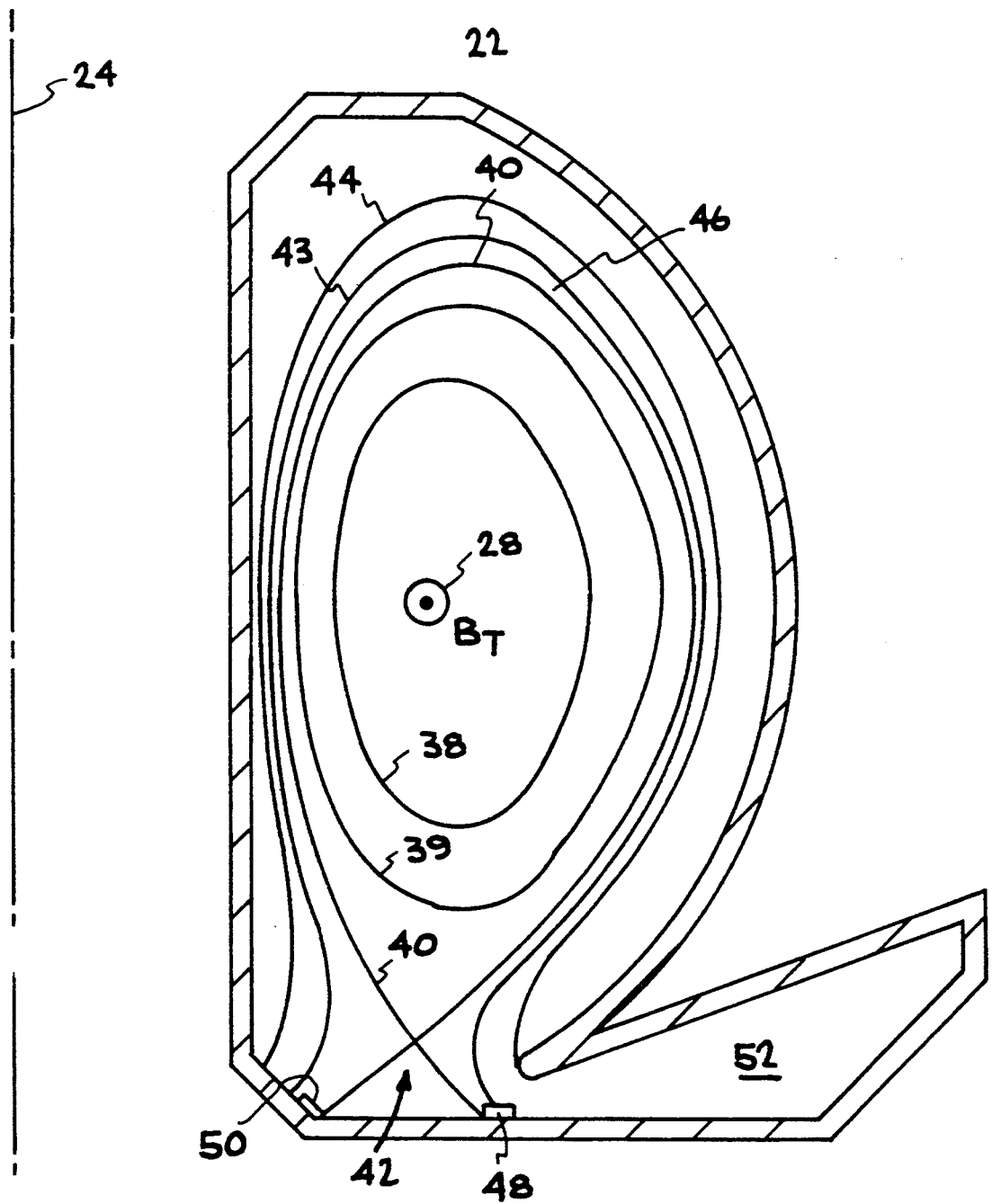
FIG. 2 diagrammatically illustrates a cross section of the plasma and vacuum vessel of a tokamak that uses a poloidal divertor.

FIG. 2 diagrammatically illustrates a cross section of the vacuum vessel 22 of the tokamak of FIG. 1, or similar tokamak, and shows representative magnetic poloidal field lines 38 and 39 that confine the plasma to the inner portions of the vacuum vessel. Most of the plasma is thus confined to an area shaped by the closed magnetic field lines 38 or 39. This portion of the cross section is thus often referred to as the plasma core. Because the plasma torus is symmetric about the major axis 24, the poloidal magnetic field lines also equivalently define toroidal surfaces, called magnetic surfaces. The circle-dot "⊙" 28 shown in FIG. 2 is conventional vector notation to show the direction of the toroidal magnetic field. In FIG. 2, the ⊙ shows the standard $B_T$ direction in the DIII-D tokamak, which is pointing out of the plane of the paper toward the viewer.

The magnetic field line 40, which represents the transition between magnetic field lines that are closed and magnetic field lines that are open, is known as the "separatrix". The separatrix 40 thus defines the boundary or magnetic surface separating the plasma that is confined within the core of the tokamak 20 (or other plasma-confining structure) and the plasma that is not confined within the tokamak. As seen in FIG. 2, the separatrix 40 crosses near the bottom of the vessel 22 at a cross point 42. The cross point 42 is also referred to as the separatrix "X-point". Any plasma on the outside of the separatrix 40 is thus not confined, and will eventually be diverted, following other magnetic force lines, such as the open magnetic force lines 43 and 44, or equivalently, open magnetic surfaces, away from the main body of plasma to the inside edges of the vessel 22.

In practice, the plasma that escapes across the separatrix flows along the magnetic field lines in a thin layer 46 just outside of the separatrix 40, known as the "scrape-off layer" (SOL), until it reaches the divertor targets 48 and/or 50. The divertor targets 48 or 50 are made from any suitable material, such as graphite, adapted to absorbed the heat of the diverted plasma and neutralize the plasma to form a gas. The gas is then collected in a plenum 52.

Figure 3:
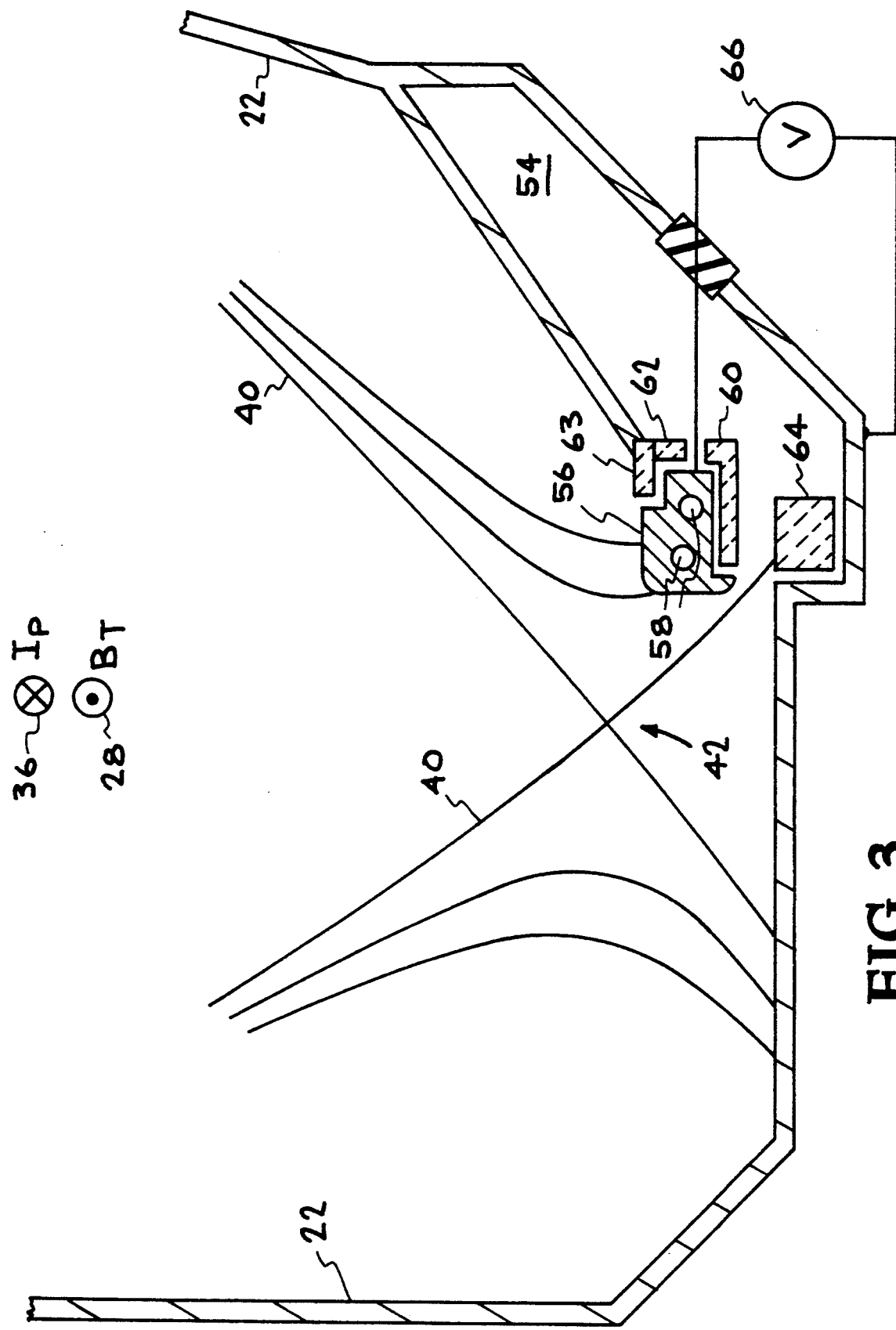
FIG. 3 diagrammatically illustrates an electrically biasable, semi-closed divertor pump.

Referring next to FIG. 3, a diagrammatic representation of a divertor electrode and pumping plenum made in accordance with the present invention is illustrated. The lower portion of the vessel 22, including the lower portion of the separatrix 40 and the X-point 42 are schematically depicted in FIG. 3. The floor of the vessel 22 in the vicinity of the X-point 42 and separatrix 40 is referred to as the divertor floor. A ring electrode 56, toroidally symmetric with the major axis 24 of the tokamak, is placed at the entrance of the a gas plenum 54. The ring electrode 56 may include cooling channels 58, through which a suitable coolant, such as water, may be circulated. In a preferred embodiment, used with the DIII-D tokamak, located at General Atomics, San Diego, Calif., the ring electrode 56 has a 20 kA capability, and is covered with a graphite armor. A liquid helium (He) cryogenic pump may optionally be positioned within the plenum volume 54.

Details associated with the design and construction of the divertor electrode 56 as shown in FIG. 3, and as implemented in the DIII-D tokamak at General Atomics, are documented by Smith, J., "Design of the DIII-D Advanced Divertor", *Proceedings 13th IEEE Symposium on Fusion Engineering* (Oct. 2-6, 1989), pp. 1315-18, incorporated herein by reference. It is sufficient for purposes of the present invention to note that the electrode 56 is electrically insulated laterally from the vacuum vessel 22 by two plasma-facing rings 63 and 64 made of boron nitride (BN). Boron nitride material from which such rings can be made is commercially available from various suppliers, such as Union Carbide Corporation. The lateral ring insulator 64 is placed at the entrance of the plenum 54 opposite the ring electrode 56. Additional insulators 60 and 62 are used to insulate the lower and outer surfaces of the ring electrode 56, respectively. The insulators 60 and 62 may be made from any suitable electrically insulative material suitable for high temperature use, such as mica and $Al_2O_3$ pieces.

It is noted that in FIG. 3, and other similar figures presented herein, only one divertor is illustrated, where the term "divertor" refers to the combination of the ring electrode 56, insulators 60, 62, 63 and 64, and entrance aperature to the plenum 54, or other ducting. The diverter illustrated in the figures is the "outer" divertor, it being located farthest from the primary axis 24, and nearest the outer wall of the vessel 22. It is to be understood that another divertor, termed the inner divertor, may also be used that is closest to the primary axis 24, and nearest the inner wall of the vessel 22.

A power supply 66 applies electrical power (sometimes referred to as the "bias potential") between the electrode 56 and the conductive wall of the vacuum vessel 22. The inner vacuum vessel surfaces that interact with plasma are covered with graphite tiles, all of which are in electrical contact with the vessel 22. During operation, the ring electrode 56 is not heated, and does not reach temperatures at which thermionic emission is important. The coolant channels in the ring electrode help to maintain its temperature and prevent overheating, especially when the electrode 56 is also used as a divertor plate or target, as is the case for a preferred embodiment of the invention. In such preferred embodiment, used with the DIII-D tokamak, four toroidally distributed feed conductors are also used to connect the power source 66 to the ring electrode 56 to ensure that local magnetic errors are small, even at the 20 kA design maximum electrode current.

As is known in the art, the separatrix strike position is controlled by the X-point location, which in turn is controlled by the current distribution in the lower poloidal field shaping coils. Advantageously, by controlling such current distribution in an appropriate manner, the outer strike position can be varied smoothly from the middle of the divertor floor to the upper surface of the ring electrode 56. Such feature permits the separatrix strike position to be swept across the divertor floor, thereby reducing the heat flux absorbed in the divertor floor by time averaging.

Figure 4:
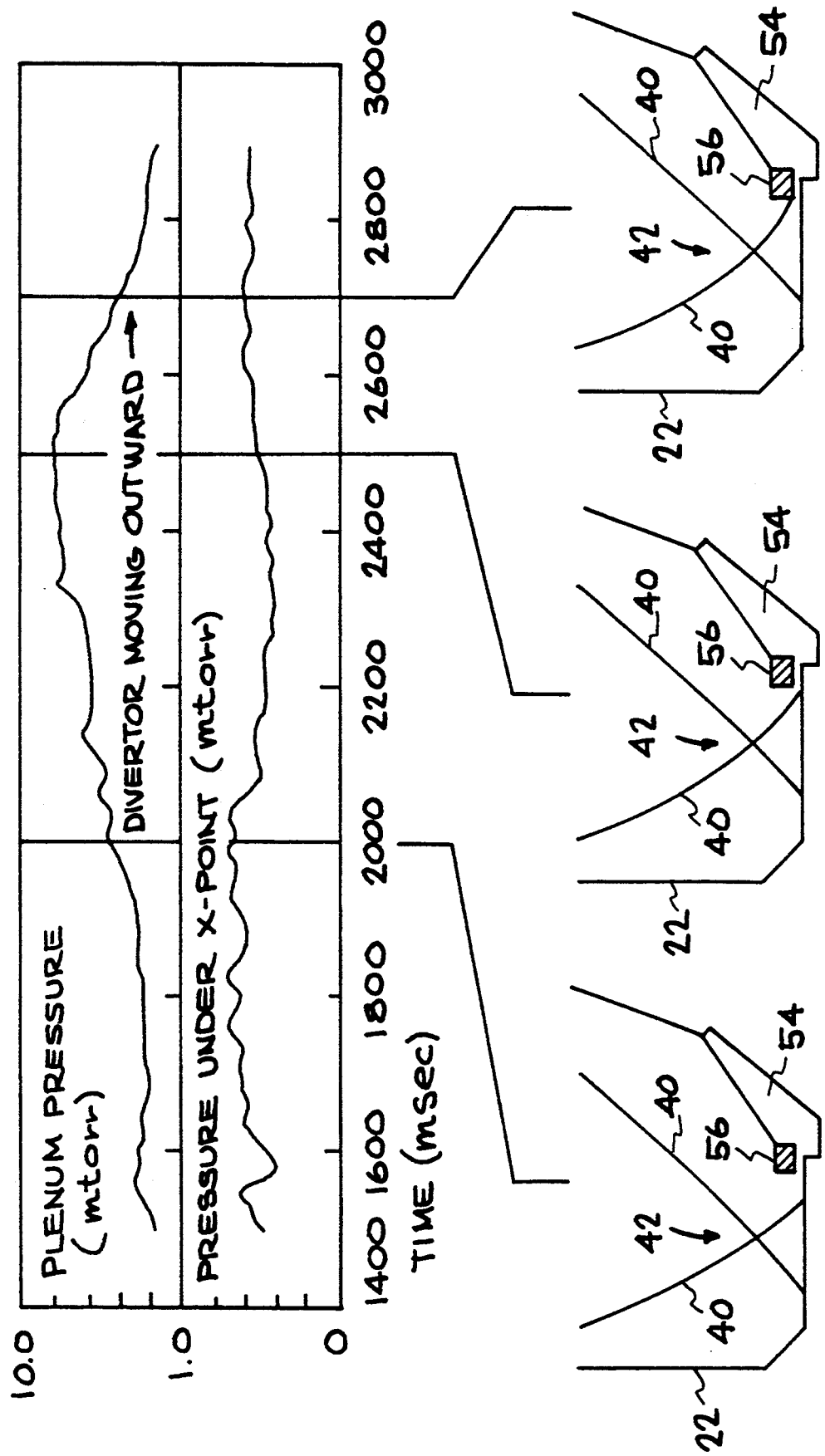
FIG. 4 depicts the plenum and X-point gas pressure during a slow outward divertor sweep when the divertor electrode is maintained at the same potential as the vacuum vessel.

Unfortunately, the gas static pressure in the plenum 54 is very geometry sensitive, i.e., it varies as a function of the position of sweeping X-point. To demonstrate this dependence, the gas static pressure was examined as a function of separatrix position by sweeping the X-point 42 slowly in the radial direction (over a time period of about 1600 msec) while maintaining otherwise unvarying plasma conditions. During this study, the potential of the electrode 56 was maintained at the same potential as the vessel structure 22, so as not to influence the plasma. The results of such a study, made using the DIII-D tokamak previously referenced, are illustrated in FIG. 4. As seen in FIG. 4, the plenum gas pressure increased as the separatrix neared the entrance aperture of the plenum 54. The maximum pressure occurred when the separatrix 40 was within about 1 cm of intercepting the lower inside corner of the electrode 56 (corresponding to a time of about 2500 msec on the horizontal axis of the pressure vs. time graph included in FIG. 4). The pressure then decreased rapidly with additional outward displacement. Pressures under the X-point and above the plenum remained low at all times.

Figure 5:
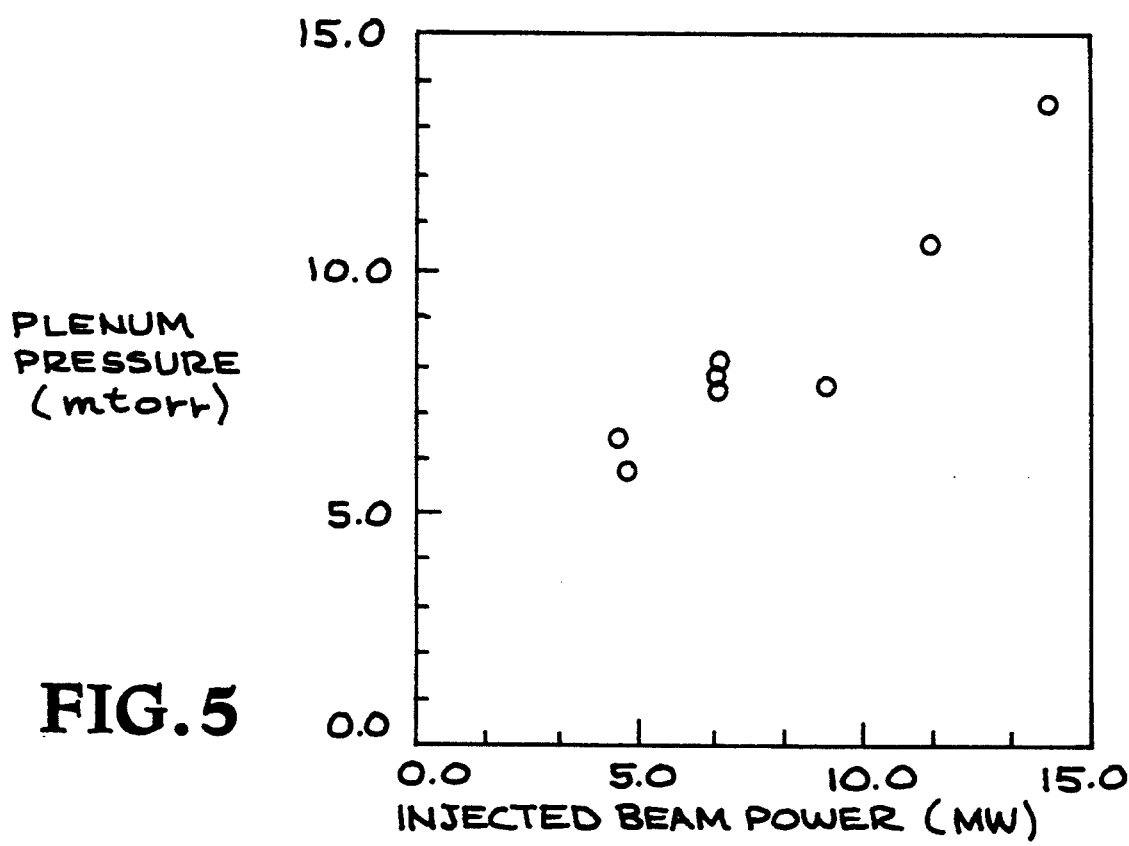
FIG. 5 shows the plenum gas pressure at optimum position versus neutral beam power during H-mode operation.

It is noted that plenum pressure at the optimum (highest pressure) separatrix location depends on several parameters, including plasma density and divertor surface condition. The pressure also depends on neutral beam heating power as shown in FIG. 5. The plenum gas pressures shown in FIG. 5 are for H-mode operation and are the maximum values measured during slow divertor sweeps like the one illustrated in FIG. 4. As seen in FIG. 5, pressures on the order of 10 mtorr are typically obtained, and such pressures are sufficient for practical high-throughput pumping in a tokamak, such as the DIII-D tokamak.

Figure 6:
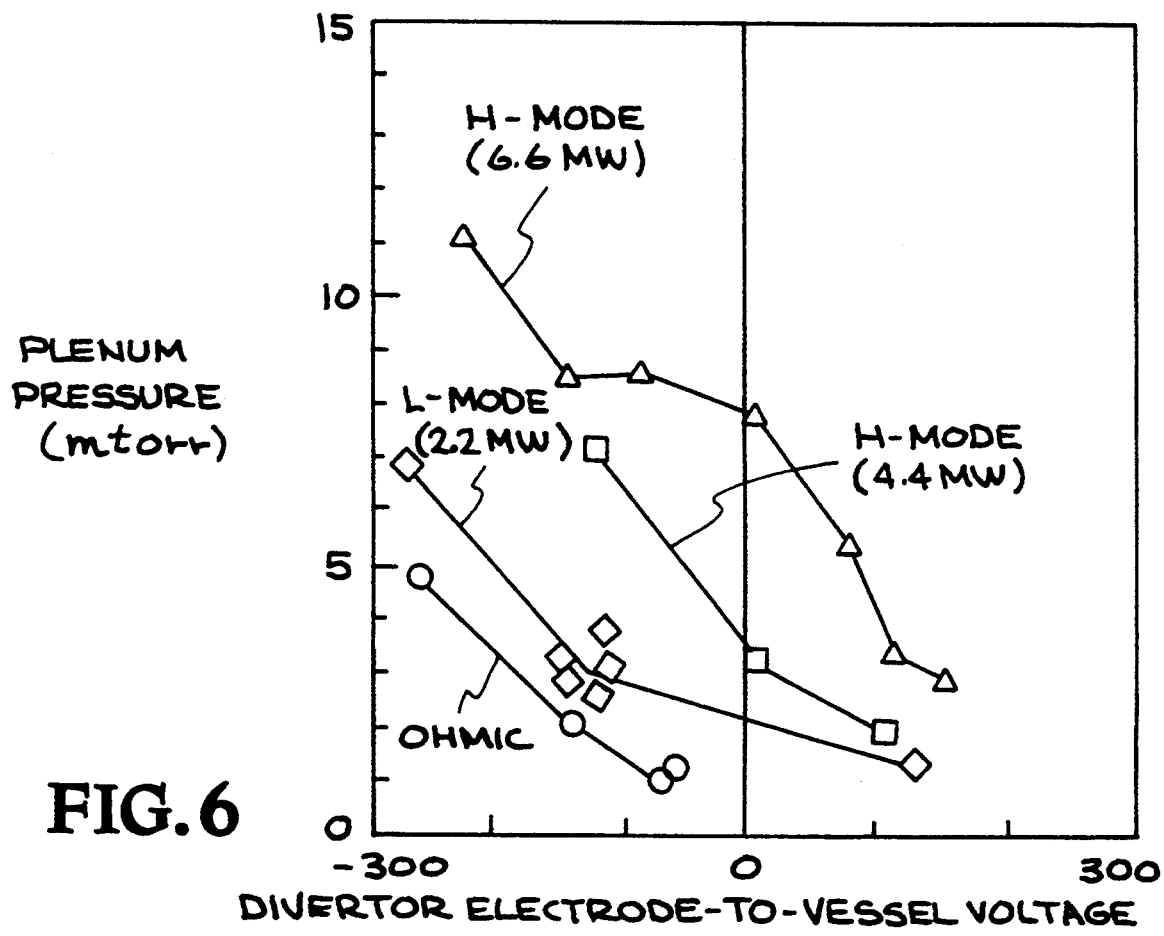
FIG. 6 shows the plenum gas pressure at optimum position as in FIG. 5 for four different plasma conditions.

Another factor influencing the plenum pressure is electrode bias. The effect of applied electrode bias is depicted in FIG. 6, where plenum pressure for Ohmic, L-mode and ELMing H-mode single-null discharges using the standard DIII-D tokamak toroidal magnetic field and plasma current directions is depicted. (Note that "ELMing" refers to the presence of Edge Localized instability Modes. ELMs are a common feature of H-mode operation and are described in the "ASDEX Team" reference, cited previously.) As seen in FIG. 6, negative electrode potential relative to the vacuum vessel increases the plenum gas pressure, while positive bias potential decreases the plenum gas pressure. Further, it has been observed by other measurements not illustrated in FIG. 6 that negative electrode potential decreases particle recycling at the inner divertor and the inner wall. Similarly, it is evident that positive bias potential increases particle recycling at the inner divertor and inner wall. These effects are qualitatively present, regardless of whether the separatrix strikes the electrode 56 or the vessel floor, so long as the separatrix 40 is close enough for the diverter plasma to interact with the biased electrode 56. As was the case for the data presented in FIG. 5, gas pressure remains low under the X-point at all times. The bias electrical power used for the experiments shown in FIG. 6 was approximately 1 MW. Some of this power is radiated, while the remainder appears at the divertor electrode as heat. Advantageously, electrode operation does not contribute to plasma impurities.

The data presented in FIG. 6 was measured at the time of maximum plenum gas pressure during slow divertor sweeping as in FIG. 4 at two heating powers for medium density ($2.3 \sim 2.5 \times 10^{19}$ m$^{-3}$) Ohmic and L-mode plasmas, all at $B_T = 2.1$ T, $I_p = 1$ MA, and standard field directions. As seen from the data in FIG. 6, the dependence on bias potential appears to be monotonic in all cases where data is available. Positive bias decreases the plenum pressure, and negative bias increases the pressure. Reversal of the toroidal field direction reverses the roles of positive and negative bias.

Figure 7:
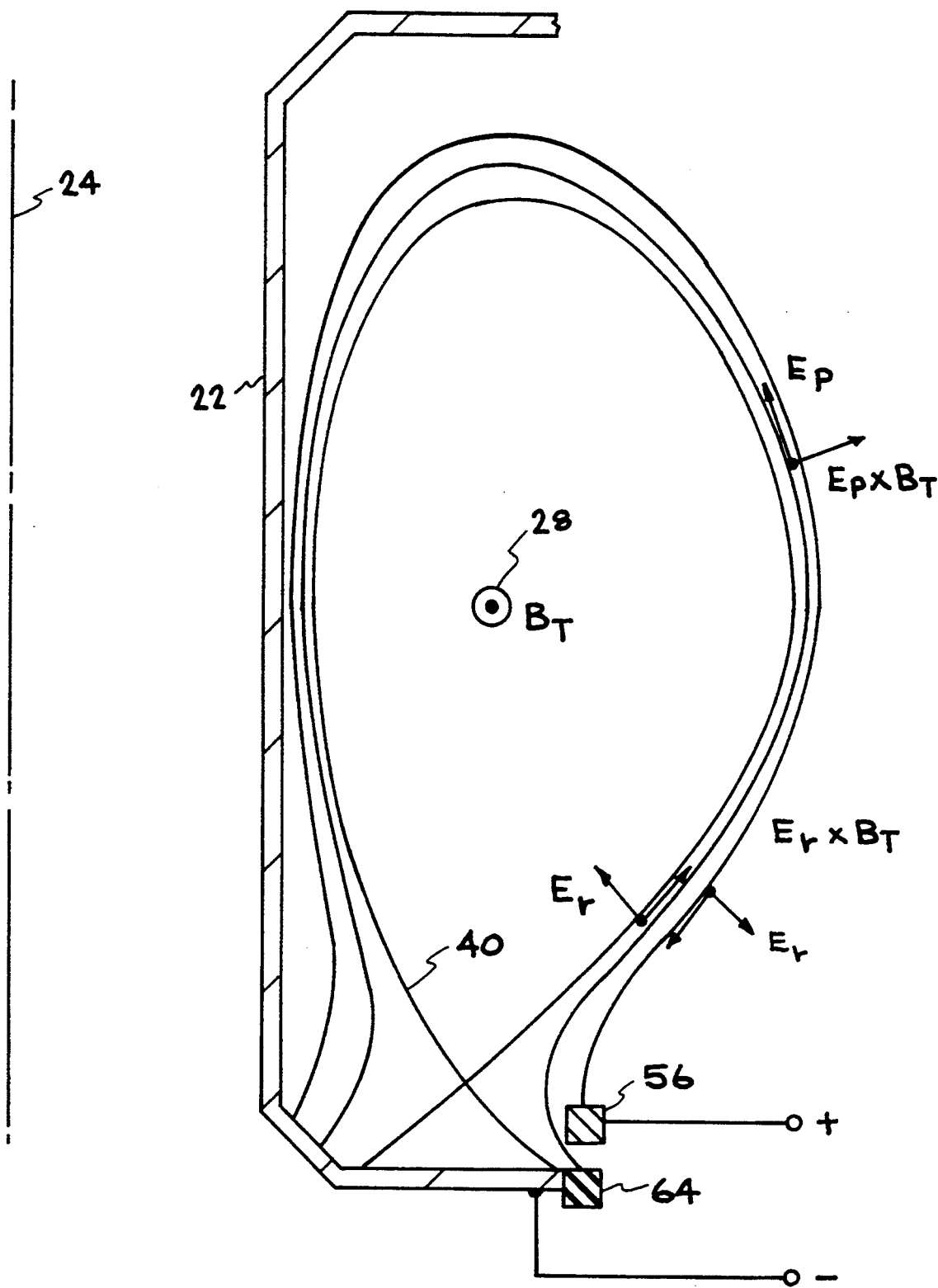
FIG. 7 diagrammatically illustrates the $E_P \times B_T$ radial flow and $E_r \times B_T$ poloidal flows when the separatrix strikes below the divertor electrode.

It is noted that the observed changes to the particle recycling and plenum pressure are qualitatively consistent with the expected consequences of bias-induced drift velocity $V_E = E \times B_T / B_T^2$ in the SOL as suggested by the early experiments of Strait, cited above. Thus, for example, as shown in FIG. 7, which is drawn for standard DIII-D field directions, the bias voltage establishes a poloidal electric field $E_P$ within the magnetic surfaces contacting the electrode 56. The resulting radial $V_E$ yields the observed recycling changes at the inner wall of the vessel 22.

As also seen in FIG. 7, a radial electric field $E_r$ is established normal to the biased magnetic surfaces. When the separatrix 40 strikes below the electrode 56, the resulting $E_r \times B_T$ produces a poloidal flow in the SOL between the separatrix and the biased surface, directing plasma toward the inner divertor for positive bias potential, and toward the outer divertor for negative bias potential. This is again in qualitative agreement with the recycling and plenum pressure observations.

When the separatrix strikes the electrode 56, the electric potential distribution becomes more complicated.

Figure 8:
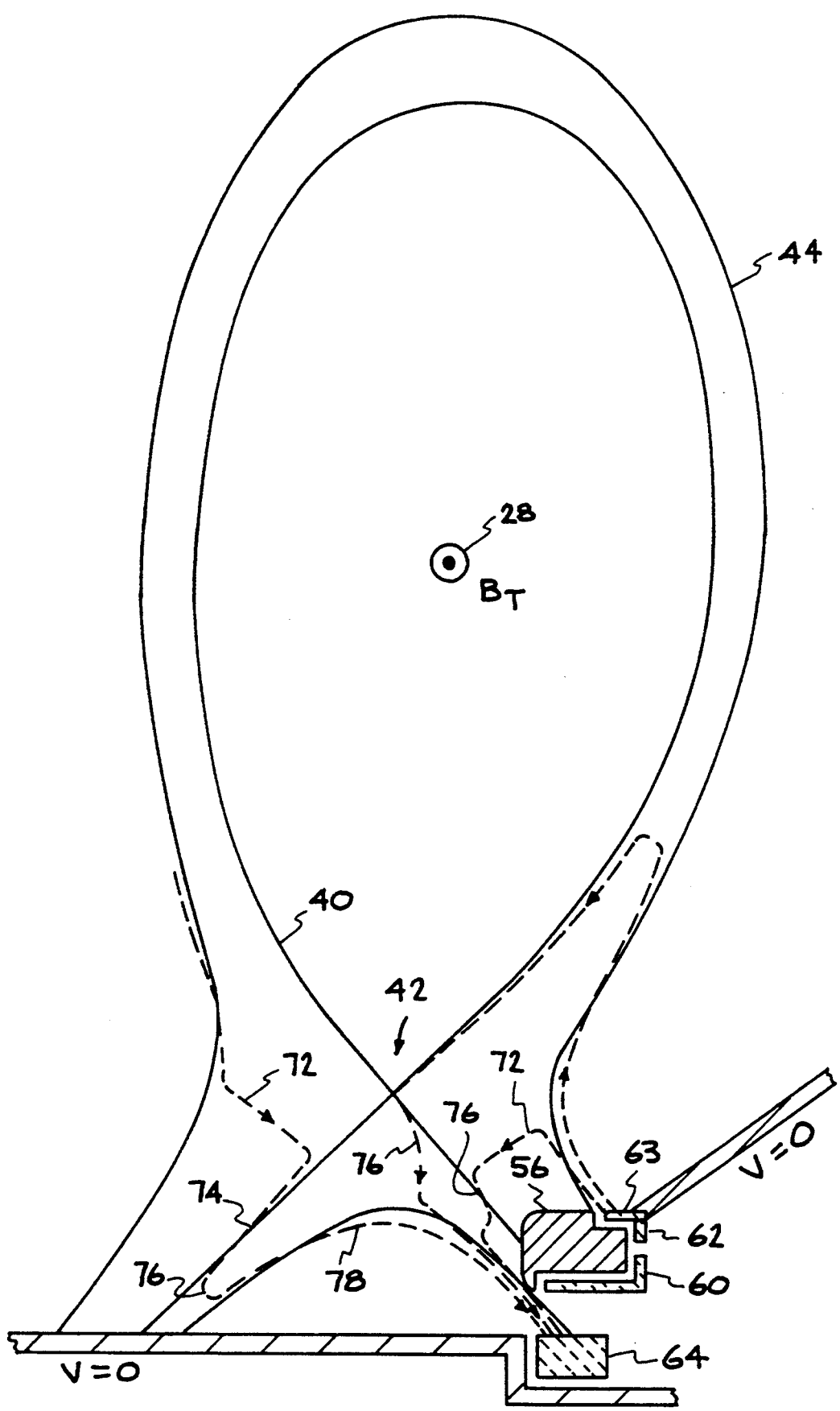
FIG. 8 qualitatively illustrates the equipotentials and resulting $E \times B_T$ flows when the separatrix strikes the divertor electrode.

Such potential distribution is shown qualitatively in FIG. 8. A large $E_r$ appears as a consequence of potential jumps across a thin boundary layer near the separatrix 40. This is so because just inside the separatrix, $E_P$ must be small, so the potential difference between large and small major radius SOL must appear across a boundary layer. A large $E_r$ also appears in the boundary layers separating biased magnetic surfaces from surfaces contacting insulators at one end and the vessel at the other, such as the boundary layer 72. Because the leakage of current across B is small, any surfaces contacting the vessel at one end and an insulator at the other remain close to vessel potential.

FIG. 8 qualitatively depicts how the $E \times B_T$ flow, which is along equipotential surfaces, drives plasma across the SOL, along paths 72; across the divertor separatrix along paths 74; across the X-point 42; and across the "arch-shaped" surfaces below the X-point, following paths 76. Then, the large $E_r$ in the boundary layer that grazes the lower inside corner of the electrode 56 drives the plasma rapidly along path 78 into the plenum entrance. This driving of the plasma thus allows the electrode/separatrix geometry shown in FIG. 8 to function as an efficent plasma pump.

It is noted that although the plasma striking the electrode 56 before reaching the plenum entrance is neutralized, most of the neutral atoms are reionized near the neutralization site by the dense divertor plasma, and the reborn ions are thereafter subject to the same $E \times B$ drifts. Hence, all outer SOL ions, except those that get buried in the electrode and floor material, eventually reach the plenum entrance at the optimum position for pumping. This reionization and subsequent continued flow as plasma was absent from the early experiments of Strait, referenced previously.

Figure 9:
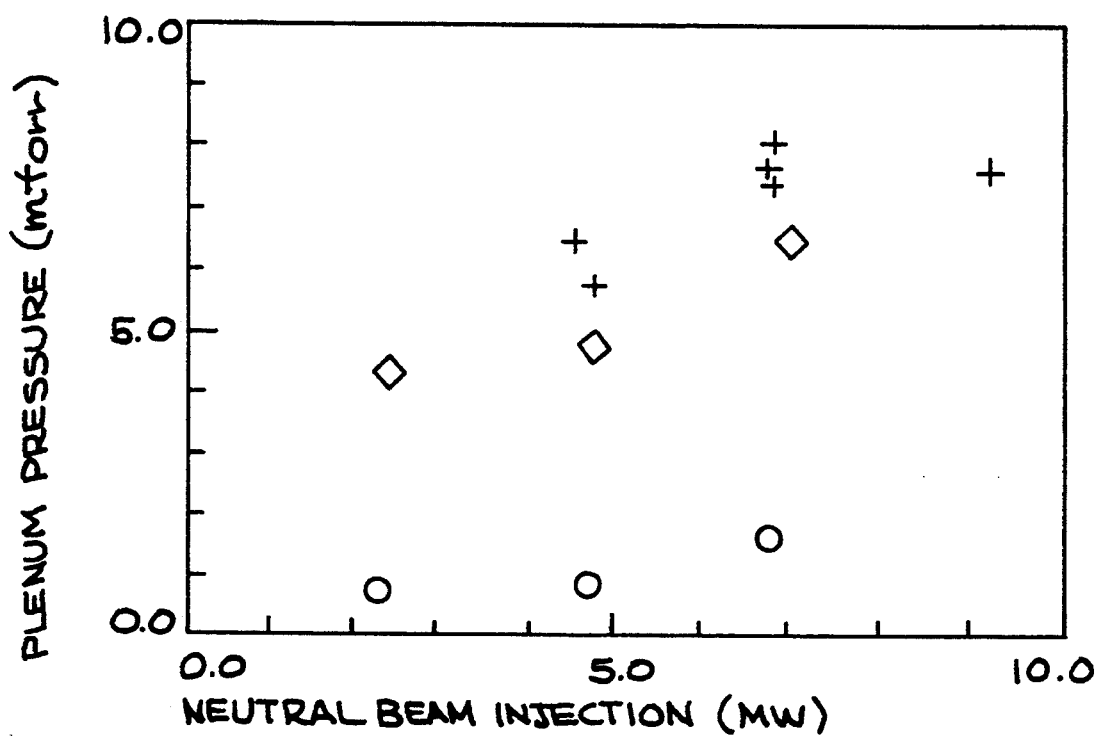
FIG. 9 shows a data plot that compares plenum gas pressure for three divertor conditions during H-mode operation as a function of neutral beam heating.

Advantageously, it has been determined experimentally that the above described process of $E \times B$ drift significantly reduces the sensitivity of the plenum pressure dependence on separatrix strike position, most notably when the separatrix strikes the electrode. Data demonstrating this feature is shown in FIG. 9, which shows a data plot comparing plenum gas pressure with neutral beam power during H-mode operation for three divertor conditions. The "+" marks are data for the separatrix diverting plasma into the entrance aperture with no bias applied to the divertor electrode 56 as in FIG. 5 (separatrix not striking the electrode, optimum positioning for maximum pressure). The "O" marks are data for the separatrix striking the electrode, still with no bias applied to the electrode 56. The " " marks are data for the separatrix striking the upper inside corner of the electrode, and with bias applied to the electrode 56.

As seen from the data presented in FIG. 9, even when the separatrix strikes the upper inside corner of the electrode (which for the DIII-D where the data were taken is 7 cm above the top of the plenum entrance aperture), the plenum pressure with bias is almost as high as the pressure for the separatrix optimally positioned in the aperture without bias. Further, when the separatrix is in the high position, the pressures with bias are about four times higher than those without. Thus, the biased divertor acts as an $E \times B$ plasma pump, particularly when the separatrix strikes the electrode.

The operation of the plasma pump of the present invention may be analyzed by considering a potential difference "V" applied across a plasma gap of width "w". The pump cross section is Lw, where "L" is the dimension in the magnetic field direction. The pump speed, $S_E$, may then be expressed as $$S_E = L w v_E = L w E / B_T = L V / B_T,$$

where $$V = \int E \cdot dw \approx wE.$$

Note that the $v_r$ and $v_P$ pumping speeds are approximately the same. For the experiments described, $L = 2\pi R \approx 10$ m; $V/B \approx (200 \text{ V})/(2\text{T}) = 100$ m$^2$/s, so $S_E \approx 1000$ m$^3$/s. For comparison, the mechanical vacuum pumps presently installed on the DIII-D tokamak have a combined speed of only about 10 m$^3$/s.

Figure 10:
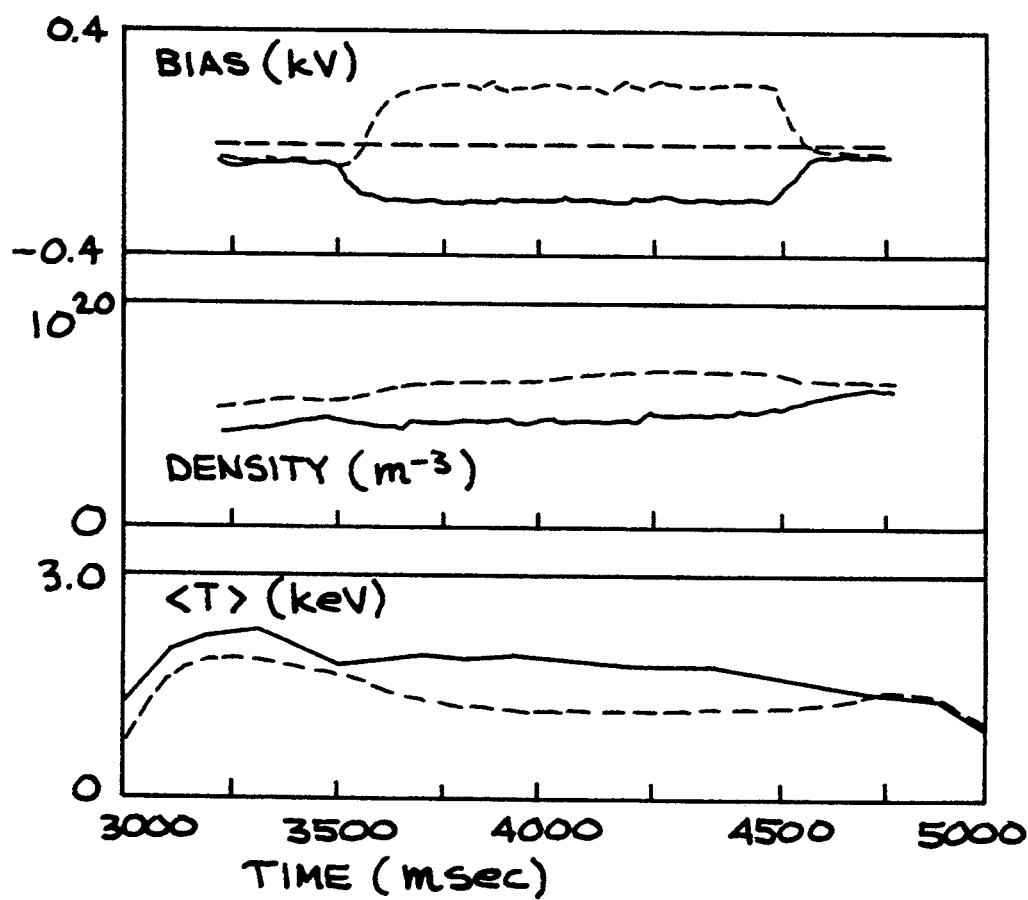
FIG. 10 illustrates the bias potential, average density, and average temperature during H-mode operation as a function of time.

It is noted that the steady state plasma density in the DIII-D tokamak during operation in the H-mode is proportional to the current, and depends on little else. The density cannot be varied appreciably by normal operational procedures. However, modest controlled density changes were observed under conditions of strong divertor bias, as shown by the data presented in FIG. 10. FIG. 10 illustrates the applied bias potential, average density, and average temperature during H-mode operation as a function of time. As seen in FIG. 10, for normal field directions, negative bias reduced plasma density and positive bias increased plasma density. The density changes were achieved, even though the planned pumps have not yet been installed in the divertor plenum 52. The density changes were accompanied by reciprocal changes in the volume-averaged temperature (average of $T_e$ and $T_i$) such that the total energy and energy confinement time remained nearly constant.

Hence, as indicated above, it is seen that the present invention offers an excellent means for particle control in a tokamak, or similar plasma-confinement apparatus. Neutral gas pressures on the order of 10 mtorr are possible during operation in the H-mode when optimum separatrix position is maintained. By using the plasma pump of the present invention, the $E \times B$ drift also transports particles across the SOL and optimally into the plenum entrance when the separatrix strikes the electrode (which is far removed from the optimum positioning of the separatrix). Hence, through the selective application of a bias potential to the divertor electrode, the divertor acts as a geometry-insensitive high capacity pump to drive plasma into the plenum aperture. Such plasma pump can advantageously be used to reduce vacuum pumping requirements for steady state plasmas; to exhaust plasma from low density plasmas; to establish low collisionality, low density H-mode plasmas for current drive; and to make plasma exhaust insensitive to divertor geometry, especially to the variable geometry of swept divertors.

While the invention herein disclosed has been described by means of specific embodiments and applications thereof, numerous modifications and variations could be made thereto by those skilled in the art without departing from the scope of the invention set forth in the claims.

What is claimed is:

1. An electric field plasma pump for use within a plasma-confining apparatus, said plasma-confining apparatus including a vacuum vessel having electrically conductive walls, and having means for generating magnetic fields B to confine a plasma to the interior of said vacuum vessel, said plasma-confining apparatus including divertor means for diverting plasma confined within the interior of said vacuum vessel to a strike zone on at least one divertor target, said plasma pump comprising:

an entrance aperture facing said at least one divertor target through which a plasma is to be pumped said divertor target comprising an electrode positioned proximate to said entrance aperture, said electrode being electrically insulated from the electrically conductive walls of said vacuum vessel; and means for applying an electric field E between said electrode and said electrically conductive walls of said vacuum vessel;

said electric field combining with said magnetic fields so as to impart an E×B drift velocity to said plasma that drives said plasma through said entrance aperture.

2. The plasma pump as set forth in claim 1 wherein said vacuum vessel comprises a toroid, and wherein said plasma-confining apparatus confines said plasma to a toroidal shape within said vacuum vessel, said electrode comprising a ring electrode.

3. The plasma pump as set forth in claim 2 further including first electrical insulating means (63) positioned between one plasma-facing edge of said ring electrode and said electrically conductive walls of said toroidal vacuum vessel.

4. The plasma pump as set forth in claim 3 further including second electrical insulating means (64) positioned on an inner surface of said electrically conductive walls of said toroidal vacuum vessel facing said ring electrode.

5. The plasma pump as set forth in claim 1 wherein said means for applying the electric field E between said electrode and the electrically conductive walls of said vacuum vessel includes means for applying an electrical potential to said electrode wherein said electrical potential applied to said electrode has a desired polarity relative to the electrical potential of said electrically conductive walls for said vacuum vessel.

6. The plasma pump as set forth in claim 1 wherein said divertor means includes means for sweeping a plasma strike zone across said electrode, the geometry of said strike zone relative to said entrance aperture thereby changing; and means for selectively adjusting the magnitude of said applied electric field E so as to render said plasma pump substantially geometry-insensitive.

7. A plasma pump for use in a plasma-confining device, said plasma-confining device including means for generating a magnetic field B to confine a plasma to a prescribed volume within said plasma-confining device, said plasma pump comprising:

electrode means for establishing an electric field E which interacts with a magnetic field B to electromagnetically drive a plasma towards an aperture point, said electrode means further comprising a divertor target; and duct means for collecting said plasma at said aperture point.

8. The plasma pump as set forth in claim 7 wherein said plasma-confining device comprises a tokamak, and wherein said electrode means comprises:

a ring electrode encircling a major axis of a tokamak, said ring electrode being electrically insulated from a conductive wall of said tokamak, said ring electrode being positioned to interface with a separatrix of a poloidal divertor used within said tokamak, said separatrix having a strike position incident with said ring electrode, said aperture point being adjacent said ring electrode and said strike position, and biasing means for applying an electric potential to said ring electrode relative to said conductive wall of said tokamak structure.

9. The plasma pump as set forth in claim 8 further including first insulating means for electrically insulating plasma-facing sides of said ring electrode.

10. The plasma pump as set forth in claim 9 further including second insulating means spaced apart from said ring electrode for electrically insulating a portion of said tokamak structure facing said ring electrode, said aperture point being located intermediate said ring electrode and said second insulating means.

11. The plasma pump as set forth in claim 8 wherein the polarity of said electric potential applied to said ring electrode by said biasing means relative to the electric potential of said conductive wall of said tokamak structure is selected in conjunction with the polarity of said toroidal magnetic field such that the $E \times B/B^2$ plasma flow velocity is directed toward said aperture point.

12. The plasma pump as set forth in claim 8 wherein said ring electrode includes coolant channels formed therein such that a coolant may be circulated through said channels in order to remove heat from said ring electrode.

13. A method for removing plasma exhaust from a tokamak system, said tokamak system including a vessel and means for generating a magnetic field B that confines plasma within a toroidal volume within said vessel; said tokamak system further including a poloidal divertor having a separatrix X-point and scrape-off layer (SOL) associated therewith, with plasma being diverted by said poloidal divertor along said SOLs to a strike position adjacent said X-point; said tokamak system further having duct means for collecting plasma exhaust; said method comprising the steps of:

(a) positioning a ring electrode near a strike position such that said ring electrode makes contact with plasma in a SOL and such that the separatrix of a poloidal divertor is incident upon said ring electrode:

(b) insulating a plasma-facing side of said ring electrode from the vessel walls and duct means of the tokamak system with a first insulator;

(c) insulating a portion of a wall of the vessel adjacent said strike position but spaced apart from said ring electrode with a second insulator;

(d) positioning an entrance aperture of said duct means intermediate to said ring electrode and said second insulator; and (e) applying an electric field E between said ring electrode and said vessel wall, whereby an E×B drift is developed which drives plasma being diverted towards said strike position through said entrance aperture.

14. The method as set forth in claim 13 wherein step (e) includes applying a biasing potential to said ring electrode having a polarity selected in conjunction with the sign of a toroidal magnetic field such that the $E \times B/B^2$ plasma flow velocity is directed toward said entrance aperture.

* * * * *